(12) United States Patent
Torkoly

(10) Patent No.: US 11,378,940 B2
(45) Date of Patent: Jul. 5, 2022

(54) SYSTEM AND METHOD FOR INTEGRATING PRODUCTION PROCESS

(71) Applicant: Econometrix Kft., Budapest (HU)

(72) Inventor: Tamas Torkoly, Budapest (HU)

(73) Assignee: ECONOMETRIX KFT, Budapest (HU)

( * ) Notice: Subject to any disclaimer, the term of this patent is extended or adjusted under 35 U.S.C. 154(b) by 607 days.

(21) Appl. No.: 16/342,728

(22) PCT Filed: Oct. 17, 2017

(86) PCT No.: PCT/HU2017/050044
§ 371 (c)(1),
(2) Date: Apr. 17, 2019

(87) PCT Pub. No.: WO2018/073611
PCT Pub. Date: Apr. 26, 2018

(65) Prior Publication Data
US 2019/0265684 A1    Aug. 29, 2019

(30) Foreign Application Priority Data
Oct. 18, 2016 (HU) .................................. P1600584

(51) Int. Cl.
| G06F 7/66 | (2006.01) |
| G05B 19/418 | (2006.01) |
| G06N 7/00 | (2006.01) |
| G06Q 10/06 | (2012.01) |
| G07C 3/08 | (2006.01) |
| G06Q 40/00 | (2012.01) |
| G06Q 50/04 | (2012.01) |

(Continued)

(52) U.S. Cl.
CPC ....... *G05B 19/41865* (2013.01); *G06F 30/20* (2020.01); *G06N 7/005* (2013.01); *G06Q 10/0633* (2013.01); *G06Q 10/0637* (2013.01); *G06Q 40/00* (2013.01); *G06Q 50/04* (2013.01); *G07C 3/08* (2013.01); *G05B 2219/32328* (2013.01); *G07C 3/14* (2013.01); *Y02P 90/02* (2015.11); *Y02P 90/80* (2015.11)

(58) Field of Classification Search
CPC .............................................. G05B 19/41865
USPC .......................................................... 700/100
See application file for complete search history.

(56) References Cited

U.S. PATENT DOCUMENTS 8,301,486 B1 * 10/2012 Marsten ................. G06Q 30/00
  705/7.31
10,268,187 B2 * 4/2019 Kobayashi ....... G05B 19/41865
(Continued)

FOREIGN PATENT DOCUMENTS

WO    WO-2008133613 A1 *  11/2008  ............. G06Q 10/06

*Primary Examiner* — Evral E Bodden
(74) *Attorney, Agent, or Firm* — Olson & Cepuritis, Ltd.

(57) ABSTRACT

Multilevel production processes are integrated utilizing as input a relatively lower production level. Activities at the lower production level producing an end product and physical parameters that influence these activities are identified, the identified physical parameters are measured with sensors, and a quota fulfillment probability index for an activity is determined using the measured physical parameters. The quota fulfillment probability index is supplied to a production entity operating at a consecutive, relatively higher production level than the activities at the relatively lower production level.

12 Claims, 5 Drawing Sheets

Figure 1:
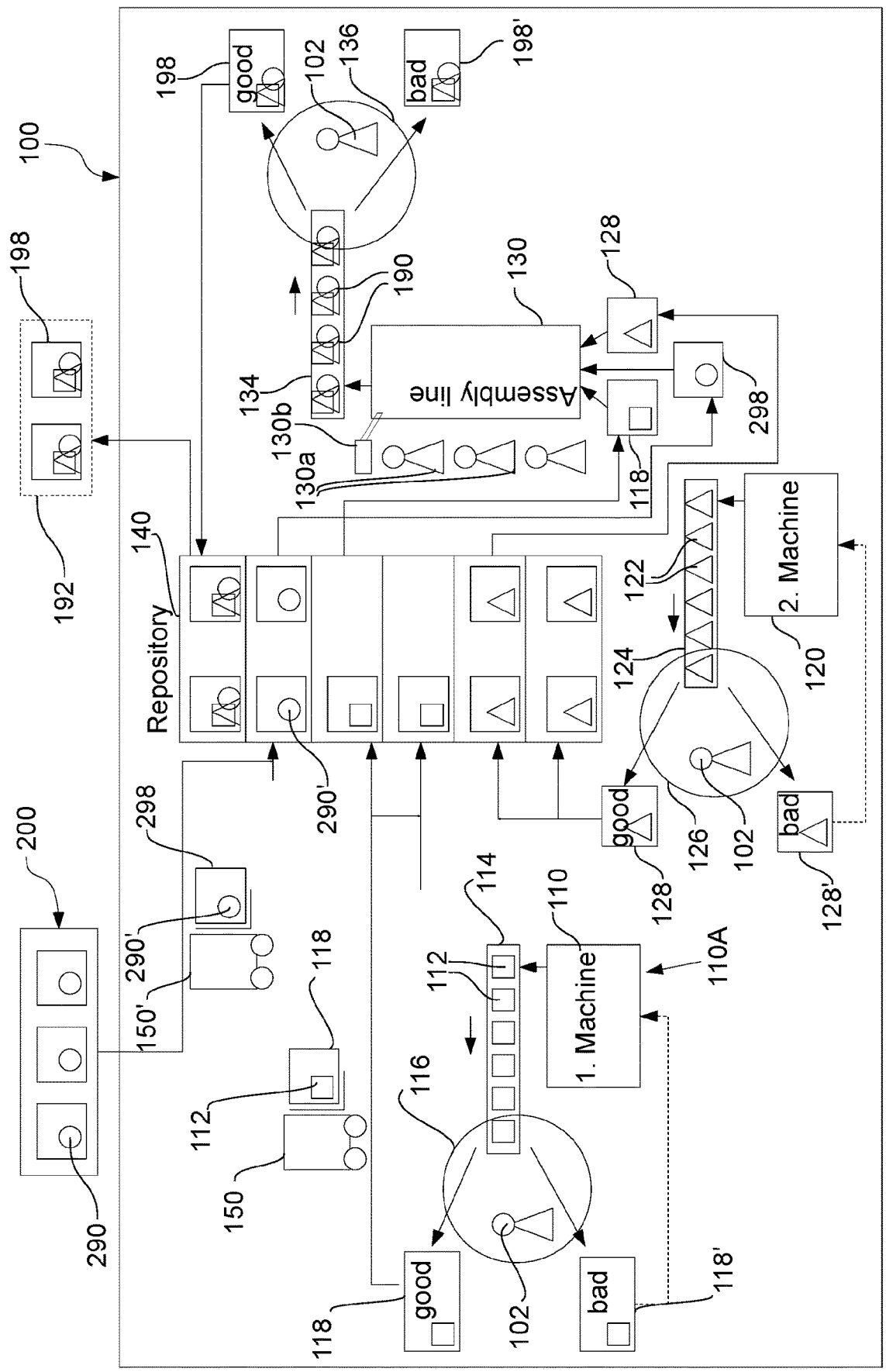

(51) Int. Cl.
    *G06F 30/20*         (2020.01)
    *G07C 3/14*         (2006.01)

(56)           References Cited

U.S. PATENT DOCUMENTS

| | | | |
|---|---|---|---|
| 2009/0164262 A1* | 6/2009 | Ettl | G06Q 10/06 |
| | | | 705/7.12 |
| 2014/0223583 A1* | 8/2014 | Wegner | G06Q 10/06 |
| | | | 726/33 |
| 2018/0027218 A1* | 1/2018 | Kiso | G05B 19/41805 |
| | | | 705/7.14 |
| 2018/0150065 A1* | 5/2018 | Yamazaki | G06F 9/505 |
| 2019/0312429 A1* | 10/2019 | Vitullo | H02J 3/00 |

\* cited by examiner

SYSTEM AND METHOD FOR INTEGRATING PRODUCTION PROCESS

CROSS-REFERENCE TO RELATED APPLICATION

This application is a U.S. National Stage of PCT/HU2017/050044, filed Oct. 17, 2017, which claims priority to Hungarian Application No. P1600584, filed on 18 Oct. 2016, both of which are incorporated herein by reference.

The object of the invention relates to a production process integrating method for the integration of multilevel production processes in which the end product produced by a production entity operating on a lower production level serves as input material for a production entity operating on a consecutive higher production level.

The object of the invention also relates to a production process integrating system using the method.

It is common for industrial production to take place on several production levels. In such cases the production entities operating on the individual production levels (such as factories) organise themselves into supply chains. However, the IT systems used for planning and monitoring are deficient, due to this the flow of information in international supply chains is inadequate. As a result of this, huge demand fluctuations are created at higher supplier levels. This results in three sources of loss for the members of the chain:
the accumulation of a significant amount of inventory that may be idle,
the continual re-planning of production, and the resulting production of batches of non-optimal size,
significant unused production capacities.

The objective of the invention is to overcome the above problems. The objective of the invention is especially the inter-company, horizontal and vertical integration of fragmented production capacities.

It was recognised that if the separate production entities are organised into a unified virtual production capacity the problems outlined can be solved in a framework system, which may revolutionise supply chain management. It was also recognised that the cornerstone of this is the estimation of the fulfilment time of the end products produced on the individual production levels, and the supplying of the obtained probability values to the next higher production level, where the end product serves as input material.

The solution according to the invention is a production process integrating method for the integration of multilevel production processes in which the end product produced by a production entity operating on a lower production level serves as the input material for a production entity operating on a consecutive higher production level characterised by that
identifying machine and/or human activities collaborating in the production of the end product in the production entities operating on the individual production levels, and associating production agents to the identified activities,
identifying the physical parameters influencing the activity of the production agents,
measuring the identified physical parameters with sensors,
determining a probability index relating to a fulfilment time of the activity associated with the given production agent using the measured physical parameters,
determining a probability index relating to the fulfilment time of a quota consisting of a given amount of end product to be produced on the given production level from the probability indices determined for the production agents,
the probability index relating to the fulfilment time of the quota is provided to a production entity operating on the consecutive higher production level.

The production levels are numbered in reverse order, in other words the end product sold to the consumers is produced by production level 0. The one or more input materials of the level 0 end product are supplied by production level 1, in other words the end product of production level 1 serves as input material on production level 0. Similarly, production level 2 is the supplier of production level 1, and supplies one or more input materials for production level 1. The number of production levels may be expanded downwards as required, in other words further suppliers may join the supply chain, for example, a production level 3 may join under production level 2.

A production entity may be, for example, a factory or other production/assembly plant.

For example, the noncumulative probability distribution function (also commonly called the probability density function), or cumulative probability distribution function of the fulfilment time, as probability variable, may be used as the probability index.

The object of the invention also relates to a production process integrating system that contains production entities operating on several production levels that use the method according to the invention.

Further advantageous embodiments of the invention are defined in the attached dependent claims.

Further details of the invention will be apparent from the accompanying figures and exemplary embodiments.

Figure 3:
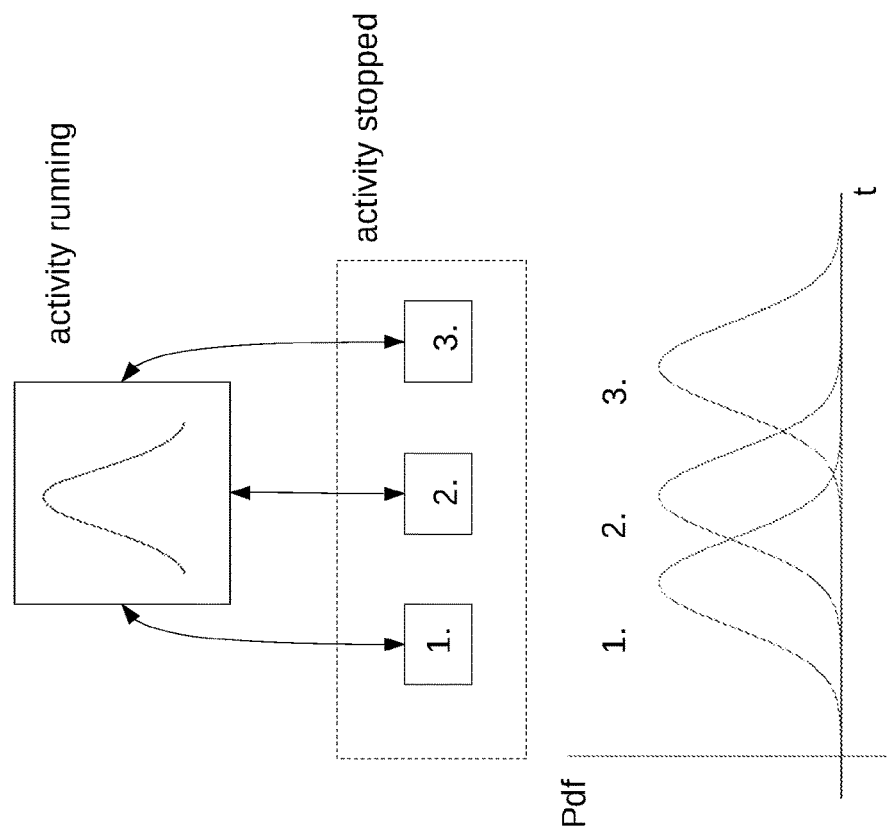
Figure 2:
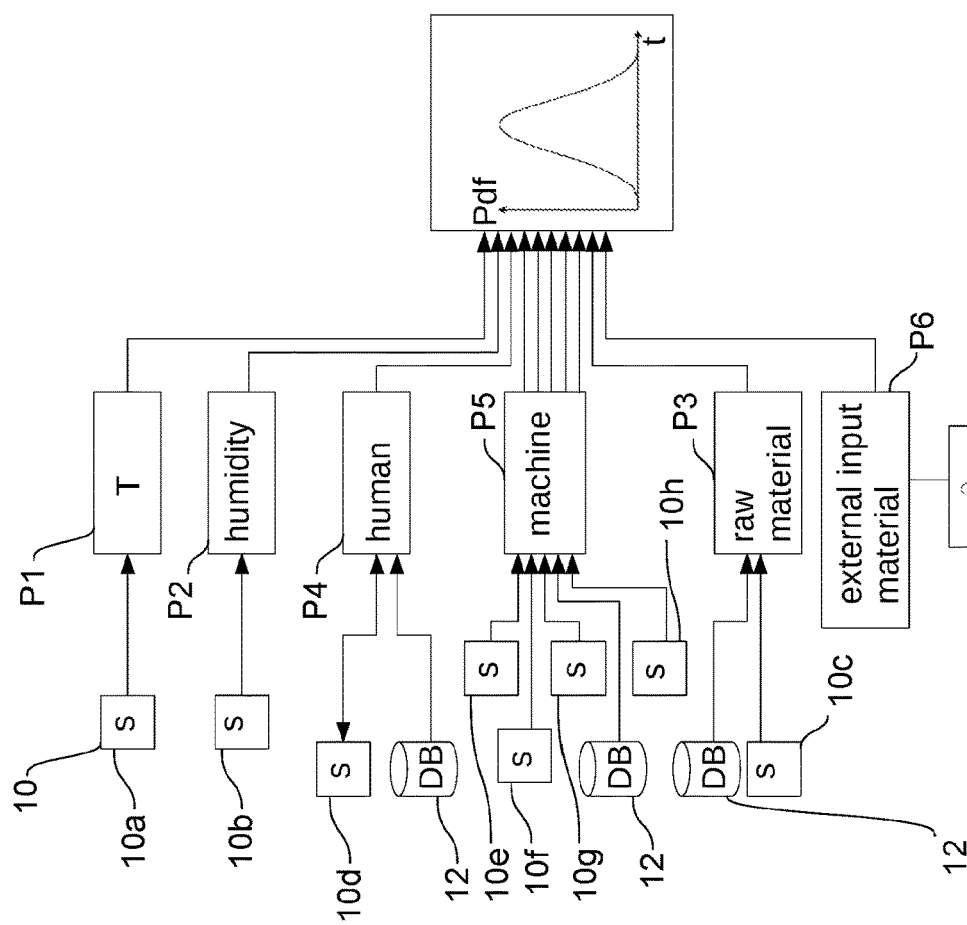
Figure 4:
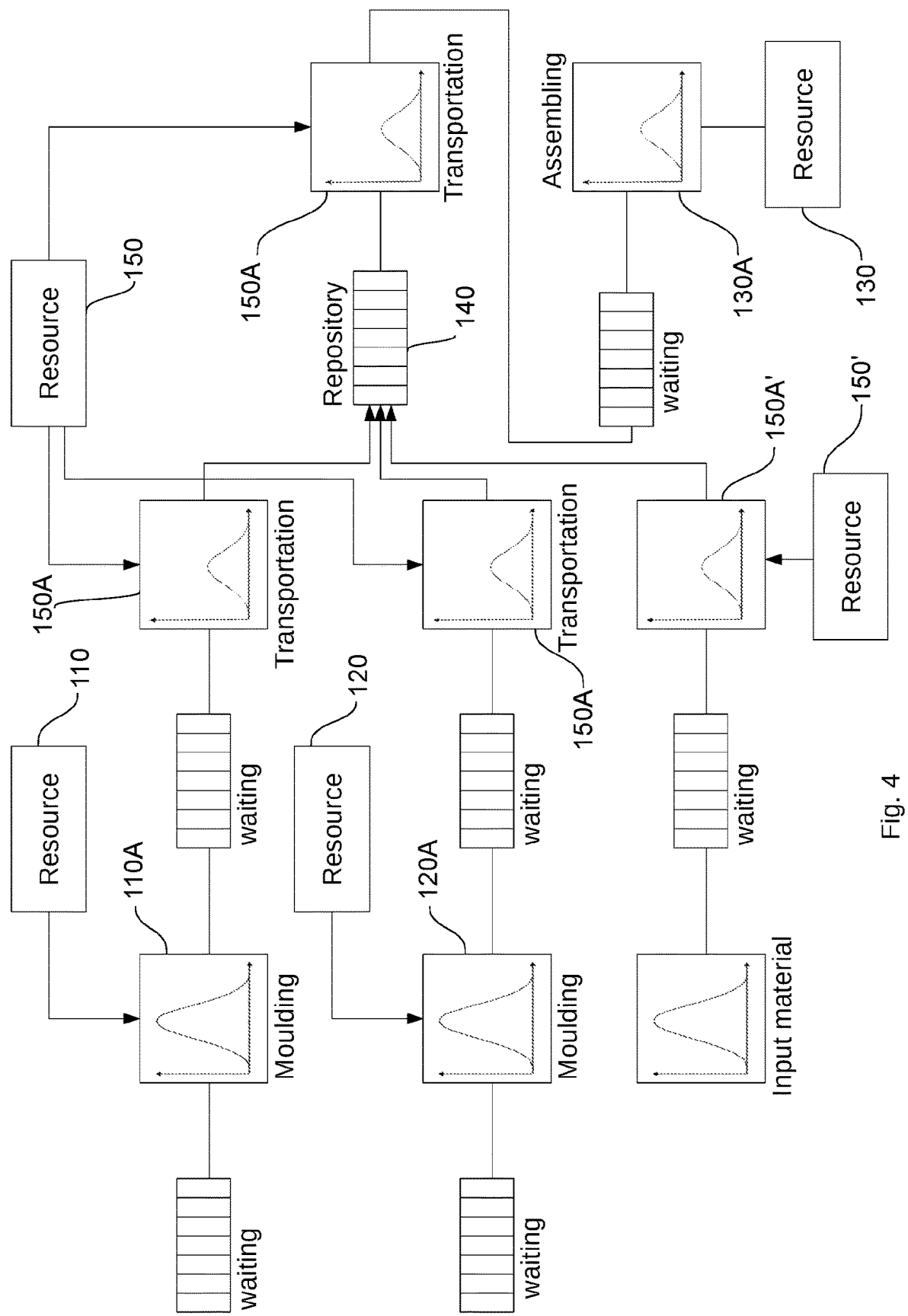
Figure 5:
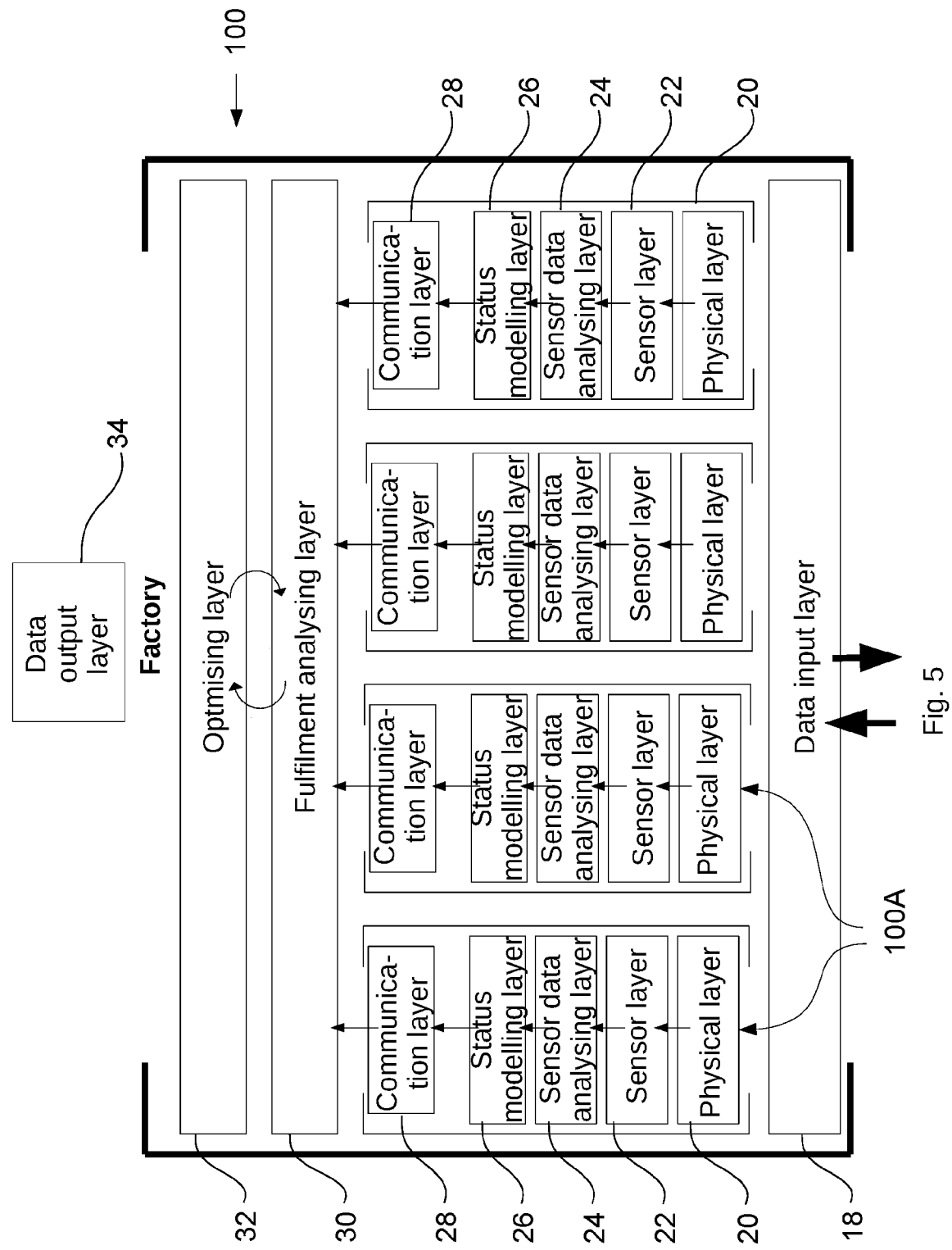
Figure 6:
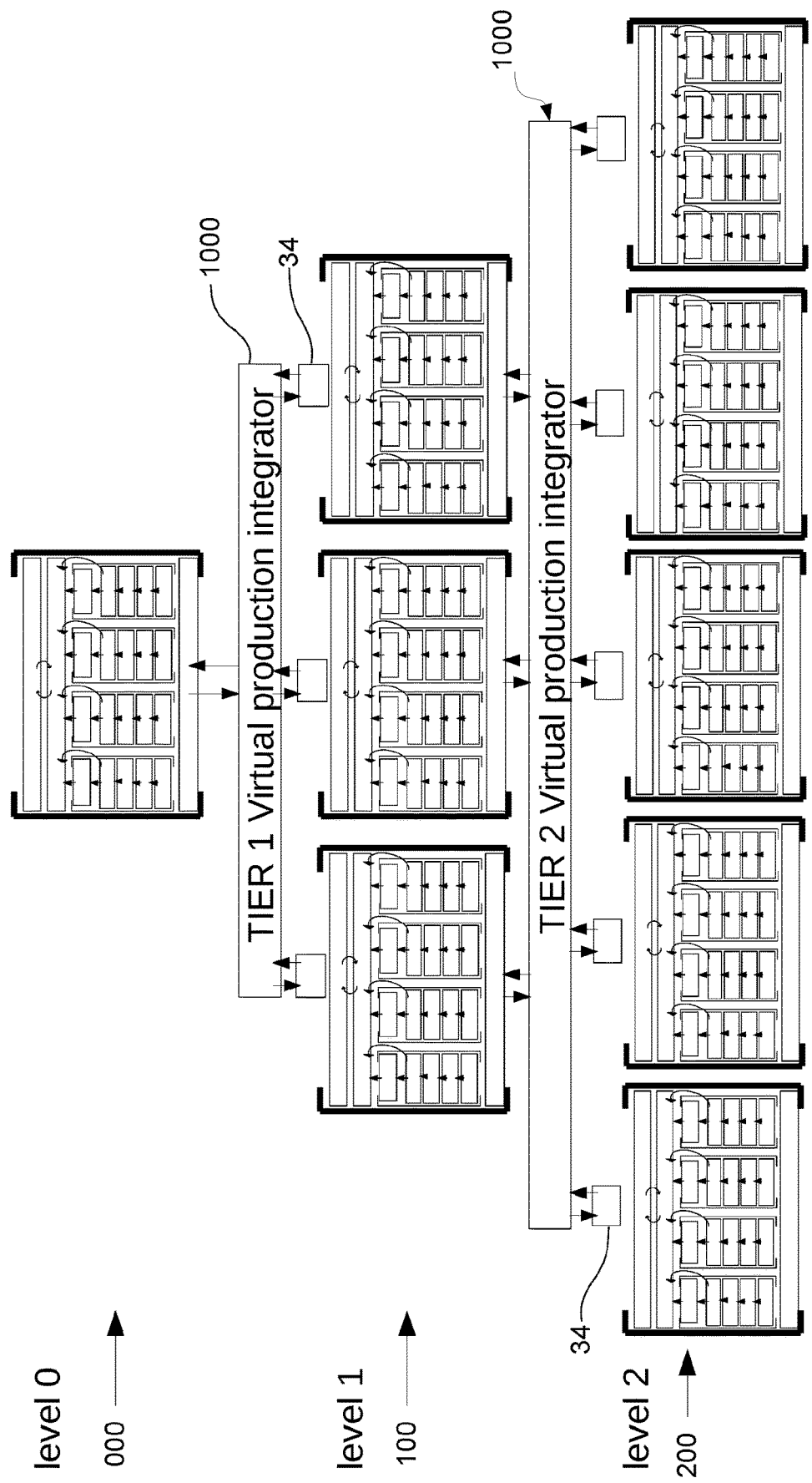

FIG. 1 is a block diagram of an exemplary production entity using the method according to the invention, FIG. 2 is a block diagram illustrating the parameters of the determination of the probability index relating to the fulfilment time of the activity of a production agent using the method according to the invention, FIG. 3 is a diagram illustrating state transitions and conditional probability indexes taking them into account, FIG. 4 is a block diagram of an exemplary discrete event simulation used in the method according to the invention, FIG. 5 is a block diagram of various layers of a virtual production entity, FIG. 6 is a block diagram illustrating the connection of virtual production entities in a multilevel production chain.

A simplified block diagram of an exemplary production entity 100 using the method according to the invention may be seen in FIG. 1. The production entity 100 may be, for example, a factory.

An exceptionally simple production process is being viewed in the interest of illustration, during which the production entity 100 manufactures a first type intermediate product 112 (such as parts) with its first machine 110, and manufactures second type intermediate products 122 (such as parts) with its second machine 120, which, using input material 290', are assembled into an end product 190 on an assembly line 130. For the sake of simplicity the intermediate products 112 and 122, and the end product 190 will be frequently referred to jointly as product.

The input material 290' is an end product 290 produced by a production entity 200 (as supplier) operating on a lower production level. Naturally, in a more complex situation the production entity 100 may also use several types of input material 290' originating from various suppliers, and the individual input materials 290' do not only have to represent the input of assembly lines 130, they may also serve as the input of other production lines, machine lines or machines. In addition to the input material 290' arriving from the external production entity 200, other input materials may also be used during production that are produced either by the given machine 110, or are acquired from outside the supply chain (such as fuel, plastic for injection moulding, etc.). For the purpose of differentiation these will be referred to as raw material, and raw material supply will be treated as being unobstructed, but, naturally, fluctuation of the raw material supply may also be taken into consideration on the basis of the same principle that will be presented later in connection with the input material 290'.

In the case of this embodiment, the intermediate products 112 and 122 manufactured by the machines 110 and 120, as well as the end products 190 produced on the assembly line 130 get to the quality control stations 116, 126 and 136 on conveyor belts 114, 124 and 134, where the quality control of the intermediate products 112, 122, and of the end product 190 takes place via a mechanised resource (such as a camera) and/or using a human resource 102 (such as by inspection). During quality control the intermediate products 112, 122, and the end product 190 are sorted into good and bad quality products. The good quality intermediate products 112, 122 and end products 190 are preferably placed in a repository 140 until they are used. In the case of the intermediate products 112, 122 their use takes place on the assembly line 130, while in the case of the end products 190 use means supply to another production entity or to points of sale (optionally to a temporary repository).

The input materials 290' arriving from the production entity 200 may also be placed in the repository 140, the use of which, in the present case, also takes place on the assembly line 130. In the case of this embodiment, several forklift trucks 150 are used to move products into and out of the repository 140.

The good quality intermediate products 112, 122, and end products 190 are preferably collected and supplied in boxes 118, 128, 198. Naturally, the intermediate products 112, 122, and the end products 190 may be repackaged, regrouped at any time, and even moved and stored without packaging.

The input materials 290' also preferably arrive in boxes 298.

The advantage of the boxes 118, 128, 198 containing a specific amount of intermediate product 112, 122 and end product 190 is that by applying a single radio frequency (RFID—Radio Frequency Identification) label to the box 118, 128, 198, the movement of the boxes 118, 128, 198 may be tracked in a known way both on the territory of the production entity 100 and outside of it also. Naturally the intermediate products 112, 122, and the end products 190 may each have a radio frequency label attached to them. The radio frequency labels may be passive, semi-passive or active labels, and may communicate according to any desired known standard (including, for example: Bluetooth, NFC—Near field communication, ZigBee, etc.).

In the case of the present embodiment, the bad quality intermediate products 112, 122 and end products 190 are collected in separate boxes 118', 128', 198'. Optionally, the bad quality intermediate products 112, 122 and end products 190 may be recycled, for example, if the machines 110 and 120 are injection moulding machines, then the bad quality intermediate products 112, 122 may be ground up to serve as raw material, as the arrows with dotted lines indicate.

In the case of this embodiment the production entity 100 itself also operates as a supplier in a supply chain, and supplies a quota 192 consisting of a specific amount of end product 190 to a production entity operating one level higher, where the end products 190 serve as input material.

The method according to the invention preferably uses agent-based simulation, in the case of which production agents are allocated to the smaller units of the production process, in other words to the machine and/or human activities belonging to the production process. Obviously the smaller the units the production process is broken down to, the more refined the simulation model is, however, this makes it more computing-intensive, therefore it is preferable to specify larger activity blocks. For example, in the case of the production entity 100 shown in FIG. 1, the activity performed by the machine 110 may be treated as the first production agent 110A with which the intermediate product 112 is produced. If the machine 110 is an injection moulding tool, then the activity belonging to the first production agent 110A is injection moulding. The activity performed with the machine 120 may be treated as another production agent 120A, the transportation performed by the forklift truck 140 as a further production agent 140A, and the assembly performed on the assembly line 130 may be treated as yet another production agent 130A. A complex activity may also be performed on the assembly line 130, in which human resources 130a, and one or more machine resources 130b may also participate. In other words, the assembly as an activity, may also be broken down into part-activities, and production agents may be separately allocated to each of these. It always depends on the nature and parameters of the part-activities whether, in a given case, a complex activity may be described with a single common production agent, as in the present case with the production agent 130A.

The activity belonging to the production agents may be influenced by numerous physical parameters. From the point of view of the production entity some of these are endogenous (internal) parameters (such as the condition of the machine, the skill of the operating personnel), and some of them are exogenous (external) parameters (such as raw material, environmental parameters). It is preferable to observe the production activity modelled with the given production agent, even for a period of several months, and during this period to determine which are those physical parameters that influence the activity, especially the fulfilment time of the activity. The physical parameters are usually measured using sensors 10, but it may also happen that some of the physical parameters are obtained as data, such as from one or more databases 12. Numerous types of sensor 10 are conceivable, such as thermometer $10a$, humidity meter $10b$, weighing device $10c$, camera $10d$, biometric detector (such as a fingerprint reader, iris scanner), pressure sensor $10e$, vibration sensor $10f$, laser detector for die closure $10g$, current consumption meter $10h$, radio frequency label reader, etc.

From the point of view of the production agent 110A the exogenous parameters P (FIG. 2) influencing the activity (injection moulding) are, for example, the following: temperature P1, humidity P2, raw material P3. Temperature P1 may be measured with a thermometer $10a$, humidity P2 with a humidity meter $10b$, and the raw material P3, as parameter, may be the information relating to the raw material (such as place of origin of the plastic), which may be extracted from a database 12, or it may be measurable data, such as weight, which may be measured using a weighing device $10c$ (such as scales).

From the point of view of the production agent 110A the endogenous parameters P influencing the activity (injection moulding) may be the following: personnel P4, machine condition P5. In the present case personnel P4, as parameter, is understood to mean that the reject rate may depend on which worker set up the machine 110 (injection mould). The parameter personnel P4 may be determined, for example, with a camera 10c, as a sensor 10, or may be extracted from a work schedule database 12. The two methods may be used to supplement each other, for example the identity of the worker who should be setting up the machine 110 at a given time is extracted from a database 12, and then a camera 10d and pattern recognition software is used to check that that worker is actually at the machine 110. Naturally other identification is conceivable, such as using a biometric sensor or with an identification code entered by the worker via a user interface.

An injection mould is also conceivable where the initial setting has no role, or every member of the personnel works in the same reliable way, in this case the parameter personnel P4 is not taken into consideration. It may also occur that the personnel influence the injection moulding (or other production activity) in other ways, in such a case the one or more parameters relating to this are described and taken into consideration. The situation is similar in the cases of the other parameters.

Machine condition P5 covers several parameters in the present case, these jointly permit a conclusion to be drawn about the machine's 110 technical condition (how reliable it is). Such parameters include, for example, the various operating parameters (injection pressure, vibration of rotating parts, die closing), as well as other parameters, such as when the machine 110 was last serviced. The latter parameter may be obtained from a database 12, for example, and the operating parameters may be measured with various sensors 10 (pressure sensor 10d, vibration sensor 10e, laser detector for die closing 10f).

The probability index relating to the fulfilment time of the activity is determined on the basis of the parameters influencing the activity (injection moulding) belonging to the given production agent 110A. The probability index relating to the fulfilment time of the quota 192 comprising a determined amount of end product 190 to be produced by the production entity 100 is determined from the probability indices determined for the individual production agents 110A, 120A, 130A, 140A.

As probability indices for example the noncumulative and cumulative probability distribution functions (or simply distribution function) of the fulfilment time, as probability variable, may be used. Usually, the distribution functions are characterised by probability density functions (PDF). The cumulative distribution function of a probability variable, evaluated at any real number x, gives the probability that the probability variable takes a value no greater than x: accordingly, this is the integral of the probability density function. Instead of distribution functions the kernels of the distribution functions may also be used as probability indices. The kernel contains those parameters from which the given probability distribution function may be produced. Another possibility, for example, is to provide the probability of fulfilment within a predetermined fulfilment time, as probability index. This is the probability value of the cumulative distribution function evaluated at the predetermined fulfilment time, which is the probability of the given process being completed within the given fulfilment time. If the fulfilment time is the fulfilment time of a quota in a supply chain, then this probability value is frequently stipulated in advance in the order for the quota, where it is referred to as a service level agreement (SLA), and refers to the reliability of the supply of the quota. It is usual in industrial supply chains to stipulate typically high SLAs of 0.9 or greater. The fulfilment time belonging to service level agreement (SLA) values specified in advance in such order contracts may also serve as a probability indicator.

The noncumulative or cumulative probability distribution function relating to the fulfilment time of the activity belonging to the production agent 110A may be determined in a known way from the parameters P influencing the activity, by using a survival model, for example.

The probability index of the fulfilment time may be corrected by monitoring the actual reject rate. This may take place automatically with sensors or on the basis of the reject number manually entered by the operating personnel. Automatic monitoring may be performed, for example, by detecting intermediate products 112, 122 when placing them in boxes 118 and/or 118', or boxes 128 and/or 128', and detecting end products 190 when placing them in boxes 198 and/or 198'. This may be performed, for example, by detecting the radio frequency label attached to the intermediate products 112, 122 and the end products 190.

It may happen that during injection moulding input material supplied by a supplier operating on a lower production level is used. For example, a part, as input material, in inserted into the injection mould, and the injection moulding takes place around the given component in such a way that the component becomes an integral part of the injection moulded piece. In such a case input material P6 is to be taken into consideration as a parameter, which also has probability indices, such as the noncumulative probability distribution function illustrated in FIG. 2, which the production entity operating on the next lower production level passes on to the production entity 100.

In the course of what has been described to this point it has been assumed that the given production agent is active, in other words the machine is operating, the workers are working, and the activity aimed at producing the intermediate product is being performed. However, the probability indices determined in this way, such as the probability distribution functions, lose their validity if the activity stops. This status transition may occur for various reasons, which include planned reasons (such as stoppage, rest time, planned maintenance, etc.) and unplanned reasons (such as a fault or accident, etc.). When the production agent is expected to be active once again, in other words when a status transition in the opposite direction occurs, depends on the reason of the stoppage. The fulfilment time is deferred according to this. The status transitions occurring for various reasons and the associated conditional probability distribution functions are illustrated in FIG. 3.

The probability of the occurrence of the various types of stoppage may be also modelled and built into a simulation.

In general the actual stoppage is detected from the values measured by the sensors 10, optionally the cause may also be determined, which serves as an initial hypothesis for the expected activity restart time.

FIG. 4 illustrates a schematic block diagram of an exemplary discrete event simulation used in the method according to the invention. Stochastic dynamic simulation is preferably used in the case of the method according to the invention, in other words at discrete intervals it is determined whether a given event (such as stoppage of a machine, starting of a production, an completion of an activity, etc.) will occur at a given time on the basis of the probability indices presented earlier, such as noncumulative distribution functions.

The starting of the individual activities may be preceded by some degree of waiting time, which may be described, for example, with the conditional probabilities described in connection with the status transitions in the case of the stoppage of an activity. Waiting times may also occur if the individual production agents used shared resources. For example, in the case of the embodiment shown in FIG. 1, it is conceivable that the transportation from the machine 110 to the repository 140, the transportation from the machine 120, and the transportation from the repository 140 to the assembly line 130 are performed by the same fork lift truck 150. In this case production agents 150A use the fork lift truck 150 as a shared resource for the individual transportations, as schematically illustrated in FIG. 4. Only one of the production agents 150A can be active at any one time, with the activity being stopped at the other production agents 150A, as the single transportation device (fork lift truck 150) is only able to perform the transportation task of one production agent 150A at a time. In the case of the present example there is a separate fork lift truck 150' for the transportation of the input material 290' arriving from the external production entity 200, therefore the activity of the production agent 150'A associated with this fork lift truck 150' does not depend on the production agents 150A modelling the other transportation. Naturally, such production entity is also conceivable where every transportation device is a shared resource.

Similarly the injection moulding machine 110 and the injection moulding machine 120 may also coincide, in this case a common injection mould behaving as a shared resource would belong to production agent 110A and production agent 120A.

Naturally, it is also conceivable that other production is taking place in the given production entity 100, which also shares the resources indicated in FIG. 3 (machines 110, 120, fork lift trucks 150, 150', assembly line 130, and the human and machine resources 102, 103 located there). Waiting times of this nature may be reduced with production optimisation within the given production entity, as will be discussed later on.

FIG. 5 depicts a block diagram of the various layers of a virtual production entity 100'. The virtual production entity 100' may be, for example, a model of the production entity 100 illustrated in FIG. 1, and the individual layers may be logical modules, to which various hardware and/or software components belong. Naturally, a model is conceivable that is different to that presented here, as is obvious for a person skilled in the art.

The vertical columns designate virtual production agents 100A, within which the following sequential layers are differentiated: physical layer 20, sensor layer 22, sensor data analysing layer 24, status modelling layer 26, communication layer 28.

The physical layer 20 means the physical reality, such as the machine 110, the operating personnel, the raw material and/or input material obtained from other suppliers and the physical environment (temperature, humidity, pressure, etc.).

The sensor layer 22 is formed by the sensors belonging to the given production agent 100A. For example, in the case of the production agent 110A allocated to the machine 110, the sensor layer 22 is formed by the sensors 10 described in connection with FIG. 2.

The sensor data analysing layer 24 is logically built on the sensor layer 22, it is here that the local analysis of the data (measured parameter values) supplied by the sensors 10 are analysed, if this is possible. For example, a computer (preferably a mini PC, such as a Raspberry Pi) may be installed beside the sensors 10 that performs the local processing or pre-processing of the measured data, therefore it is not necessary to forward all of the raw measured data.

In this case the pre-processed data get into the status modelling layer 26, which physically coincides with the local computer (preferably mini computer). Preferably, the evaluation of the status of the given production agent 100A takes place in the status modelling layer 26 on the basis of the pre-processed data, in other words whether the activity belonging to the production agent 100A is taking place or is stopped, and in the latter case to what cause does the status of the production agent 100A correspond. In other words, it is here that the actually occurring status transitions are determined.

The pre-processed data, or a part of the data, and the data relating to the status of the production agent 100A are forwarded using the communication layer 28 to the fulfilment analysing layer 30, which is a program or group of programs running on a central computer. The central computer is preferably a server that belongs to the given production entity 100, or it may even be a common central device of the production entities implementing the method according to the invention. The fulfilment analysing layer 30 does not necessarily run on a computer, the computing capacity may also be provided by computers (servers) in the cloud. For the sake of simplicity hereinafter reference will also be made to the sum total of the computers in the cloud as central computer.

The communication layer 28 is also understood to mean a wired or wireless channel that serves for forwarding the data from the local sensors 10 or optionally from the local computer to the central computer containing the fulfilment analysing layer 30.

If there is no local capacity for data processing, then the data may be forwarded directly from the sensors 10 to the central fulfilment analysing layer 30 via the communication layer 28. It may also occur that local data analysis exists, but the modelling of the status takes place in the fulfilment analysing layer 30, in this case the communication layer 28 sends the data supplied by the sensor data analysing layer 24 to fulfilment analysing layer 30.

Preferably the stochastic dynamic simulation takes place in the fulfilment analysing layer 30, on the basis of which the optimising layer 32 optimises, or schedules the production processes within the production entity 100, for example it optimises the use of shared resources between the production agents. The individual production agents 100A are continuously monitored via the sensors 10, or preferably via the monitoring of the reject rate, on the basis of which the parameters and results of the simulation may be continuously or periodically corrected in the fulfilment analysis layer 30. The empirical feedback may already be taken into account in the status modelling layer 26, for example the time of an expected stoppage may be more precisely estimated.

Other data may also be required for the stochastic dynamic simulation, which arrive from the data input layer 18. Such data may include, for example, probability indices (such as probability distribution functions, or their kernels) relating to input materials 290' originating from a production entity 200 operating on the next lower level.

Via the stochastic dynamic simulation the fulfilment analysing layer 30 determines a probability index (such as a cumulative probability distribution function) from the probability indices determined for the production agents 100A relating to the fulfilment time of a quota 192 comprising a specific amount of end product 190 to be produced in the given production entity 100, which probability index is passed on by the data output layer 34 to the production entity 000 operating on the next higher production level, as can be seen in FIG. 6. Other data traffic may be realised between the production entities 000, 100, 200 operating on the various levels, such as requests for quotes and the sending of orders towards the lower production levels, the sending of quotes to higher production levels, then, in the case of an order being placed, the probability indices relating to the fulfilment time(s) during production. Through the continuous monitoring of production and the realistic estimation of fulfilment times, virtual production integrators 1000 may be created between the individual production levels, the function of which is to make it possible to optimise production even on the global level. For example, if the fulfilment time probability index deteriorates at a supplier (for example it is only able to guarantee a significantly longer fulfilment time as compared to the value set down in the initial SLA), then the virtual production integrator 1000 may pass on the order (or the remaining amount of the order) to other production entities operating on the same level. It should be noted that in certain cases individual production entities are able to operate on several production levels, in other words they are able to join the supply chain at more than one point depending on what input material production (or processing) they obtain orders for.

The virtual production integrators 1000 may also take other parameters into consideration in addition to fulfilment time, such as price, the SLA guaranteed by the entity providing the quote, etc.

The method according to the invention provides the following advantages.

Real-time information can be provided upwards in the supply chain (in other words to production entities operating on higher levels) on the status of all devices, processes and products participating in the production.

The method is able to take into consideration that the individual participants do not share detailed information, not even with the next level in the chain.

New participants can be linked to the production entity network provided by the method in a cost-effective way irrespective of the level of development of their IT system.

The method is able to provide realistic digital mapping of the processes on the basis of the available data.

The method is also able to predict the future probability field of the production lines (due to this the risks and expected costs of the production plan become quantifiable) using models of the process.

Taking into consideration the theory of subsidiarity it is suitable for the effective allocation of the production capacities participating in the network and for their horizontal and vertical integration.

Various modifications to the above disclosed embodiment will be apparent to a person skilled in the art without departing from the scope of protection determined by the attached claims.

The invention claimed is:

1. Production process integrating method for integration of multilevel production processes in which an end product (190, 290) produced by a production entity (100, 200) operating on a lower production level serves as input material (290') for a production entity operating on a consecutive higher production level (000, 100), characterised by
identifying machine and human activities collaborating in production of the end product (190, 290) in the production entity operating on an individual lower production level, and associating production agents (100A, 110A, 120A, 130A, 140A) to said activities,
identifying physical parameters influencing an activity of the production agents (100A, 110A, 120A, 130A, 140A),
measuring the identified physical parameters with sensors (10) and obtaining measured physical parameters,
determining a probability index relating to a fulfilment time of an activity associated with given production agents (100A, 110A, 120A, 130A, 140A) using the measured physical parameters,
determining a probability index relating to a fulfilment time of a quota (192) comprising a given amount of end product (190, 290) to be produced on the production level from the probability indices determined for the production agents (100A, 110A, 120A, 130A, 140A),
providing the probability index relating to the fulfilment time of the quota (192) to a production entity (000, 100) operating on the consecutive higher production level
wherein the probability index relating to the fulfilment time of the quota (192) is determined by stochastic dynamic simulation and
wherein an intermediate product (112, 122) is produced by at least one production agent (100A, 110A, 120A, 130A, 140A), checking the quality of the intermediate product (112, 122), in case of satisfactory quality forwarding the intermediate product (112, 122) for further use, and in case of unsatisfactory quality rejecting the intermediate product (112, 122) and correcting the probability indices relating to the fulfilment times in accordance with a reject rate.

2. The method according to claim 1, characterised by determining during trial production dependence of the probability indices relating to the fulfilment time of the activity associated with the given production agent (100A, 110A, 120A, 130A, 140A) on the measured physical parameters, and monitoring an initially determined dependence of the probability indices on the physical parameters during production and correcting it in case of deviation.

3. The method according to claim 1, characterised by that in case of a predetermined deterioration of the probability index relating to the fulfilment time of the quota (192), producing the quota (192) by another production entity (100, 200) operating on the same production level.

4. The method according to claim 1, characterised by that in the step of determining the probability index relating to the fulfilment time of the activity associated with the given production agent (100A, 110A, 120A, 130A, 140A), data relating to personnel participating in said activity are used.

5. The method according to claim 1, characterised by that the physical parameters are selected from a group consisting of: temperature, pressure, humidity, vibration frequency, die closing precision, and power consumption.

6. The method according to claim 1, characterised by that the sensors are selected from the group consisting of: thermometer (10a), pressure sensor (10e), humidity meter (10b), weighing device (10c), vibration sensor (10f), laser detector for die closing (10g), other laser control systems, consumption meter (10h), radio frequency label detector, camera (10d), and biometric detector.

7. The method according to claim 1, characterised by providing an intermediate product with a radio frequency label, and tracking the movement of the intermediate product by detecting the label.

8. Production process integrating method for the integration of multilevel production processes in which an end product (190, 290) produced by a production entity (100, 200) operating on a lower production level serves as input material (290') for a production entity operating on a consecutive higher production level (000, 100), characterised by
- identifying machine and human activities collaborating in production of the end product (190, 290) in the production entities (100, 200) operating on an individual lower production level, and associating production agents (100A, 110A, 120A, 130A, 140A) to the identified activities,
- identifying physical parameters influencing an activity of the production agents (100A, 110A, 120A, 130A, 140A),
- measuring the identified physical parameters with sensors (10) and obtaining measured physical parameters,
- determining a probability index relating to a fulfilment time of the activity associated with the production agents (100A, 110A, 120A, 130A, 140A) using the measured physical parameters,
- determining a probability index relating to a fulfilment time of a quota (192) comprising a given amount of end product (190, 290) to be produced on the given production level from the probability indices determined for the production agents (100A, 110A, 120A, 130A, 140A),
- providing the probability index relating to the fulfilment time of the quota (192) to a production entity (000, 100) operating on the consecutive higher production level
- wherein the probability index relating to the fulfilment time of the quota (192) is determinded by stochastic dynamic simulation; and
- wherein a production status and at least one non-production status for the individual said production agents (100A, 110A, 120A, 130A, 140A) is determined, a probability index relating to the time of return from the at least one non-production status to the production status is determined, and the probability index relating to the time of return to production status is taken into consideration during the stochastic dynamic simulation.

9. The method according to claim 8, characterised by that in the step of determining the probability index relating to the fulfilment time of the activity associated with the given production agent (100A, 110A, 120A, 130A, 140A), data relating to personnel participating in said activity are used.

10. The method according to claim 8, characterised by that the physical parameters are selected from a group consisting of: temperature, pressure, humidity, vibration frequency, die closing precision, and power consumption.

11. The method according to claim 8, characterised by that the sensors are selected from the group consisting of: thermometer (10*a*), pressure sensor (10*e*), humidity meter (10*b*), weighing device (10*c*), vibration sensor (10*f*), laser detector for die closing (10*g*), other laser control systems, consumption meter (10*h*), radio frequency label detector, camera (10*d*), and biometric detector.

12. The method according to claim 8, characterised by providing an intermediate product with a radio frequency label, and tracking the movement of the intermediate product by detecting the label.

* * * * *